Oct. 17, 1961 T. C. JUCULANO Re. 25,053

RELEASABLE METAL SCAFFOLDING CONNECTOR

Original Filed Dec. 21, 1959 2 Sheets-Sheet 1

Inventor
Theodore C. Juculano
By Dr. Hutton Jones
Attorney

RELEASABLE METAL SCAFFOLDING CONNECTOR

Original Filed Dec. 21, 1959 2 Sheets-Sheet 2

Inventor
Theodore C. Juculano
By Dodge, Milton & Jones
Attorneys

United States Patent Office

Re. 25,053
Reissued Oct. 17, 1961

25,053
RELEASABLE METAL SCAFFOLDING CONNECTOR

Theodore C. Juculano, Oshkosh, Wis., assignor to Marvel Equipment Corporation, Oshkosh, Wis., a corporation of Wisconsin Original No. 2,962,310, dated Nov. 29, 1960, Ser. No. 860,986, Dec. 21, 1959. Application for reissue Apr. 3, 1961, Ser. No. 100,768
6 Claims. (Cl. 287—53.5)

Matter enclosed in heavy brackets [ ] appears in the original patent but forms no part of this reissue specification; matter printed in italics indicates the additions made by reissue.

This invention relates to readily releasable connectors for fastening two or more structural members together, and refers more particularly to a connector for metal scaffolding by which one end of a diagonal brace member may be securely but readily releasably anchored to a main scaffold member.

As is well known, metal scaffolding is made up of so-called panels, each of which comprises a pair of tubular uprights connected and held in parallel spaced apart relation by means of transverse members. When a metal scaffold is erected, the panels are held upright and in uniformly spaced apart alignment by means of tubular diagonal braces detachably anchored to the uprights of each panel, near their upper and lower ends. Each diagonal usually has its end portions flattened and apertured to receive a stud-like connector element.

Obviously, the connectors by which the diagonals are secured to the main panel members are a critically important element in the scaffolding, since such connectors must provide for very secure anchorage of the diagonals but must also provide for quick and easy locking and releasing of the diagonals in order to facilitate and expedite assembly and disassembly of the scaffolding.

The general object of this invention is to provide an improved connector for metal scaffolding and the like by which a tubular diagonal brace may be very securely but readily releasably anchored to an upright, and which connector is completely self-contained in that it has no components that can be separated from the scaffolding panel of which it forms a part.

Another object of this invention resides in the provision of a releasable connector for very securely but readily releasably locking an apertured detachable member to another relatively fixed member, which connector features a fixed stud upon which the apertured member is adapted to be engaged to be held by the stud against movement laterally relative to the stud, and an axially movable locking member adapted to be telescoped over the stud to releasably confine the detachable member against axial movement relative to the stud.

It is also a specific object of this invention to provide a connector for metal scaffolding, adapted to comprise a part of an upright scaffolding member, which connector has an unthreaded male connecting member or stud over which the apertured end portion of a diagonal member may be slipped without danger that threads on the stud will be worn or damaged, but wherein the diagonal member is nevertheless clampingly held by the connector by reason of the provision of a threaded locking member which cooperates with the stud.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best mode so far devised for the practical application of the principles thereof, and in which.

Figure 1:
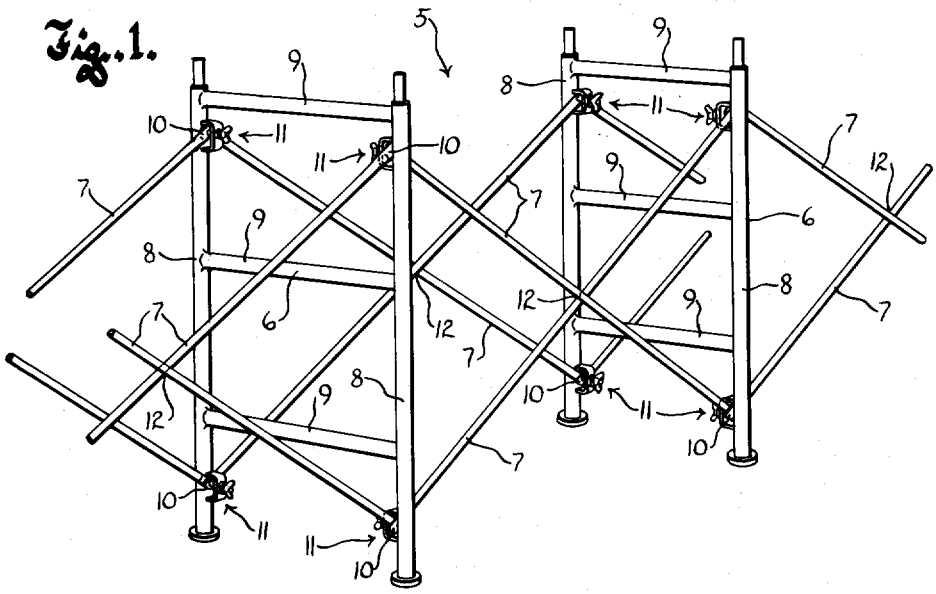
FIGURE 1 is a fragmentary perspective view of an erected metal scaffold incorporating connectors embodying the principles of this invention.

Referring now more particularly to the accompanying drawings, the numeral 5 designates generally an erected metal scaffold which comprises, in general, a plurality of end panels 6 held upright and in spaced apart alignment by diagonal braces 7. Each end panel comprises a pair of tubular uprights 8 which are held in spaced apart parallel relationship by transverse members 9 that are welded or otherwise rigidly secured to the uprights. The uprights of all of the panels are of uniform length, and every panel has the same spacing between uprights so that the panels comprise modular units which can be built up both vertically and horizontally.

The diagonal braces 7 which cooperate with the modular panels to hold them upright and properly spaced apart are usually formed of tubular stock having flattened and apertured end portions 10 which provide for securement of the diagonals to the uprights of the panels by means of connectors 11 of this invention. A connector is located near the top and near the bottom of each upright, and each diagonal is secured to an upper connector on one upright and to a lower connector on an upright of an adjacent panel, so that the two diagonals 7 at each side of each pair of adjacent panels cross between panels, as at 12, to define triangles which afford rigidity and strength to the erected scaffold structure.

For purposes of illustration the connector 11 of this invention is described herein with particular reference to its application to metal scaffolding, but it will be understood that it has general utility for any type of device in which an apertured detachable member must be very rigidly and securely but readily releasably locked to a relatively fixed member.

Figure 2:
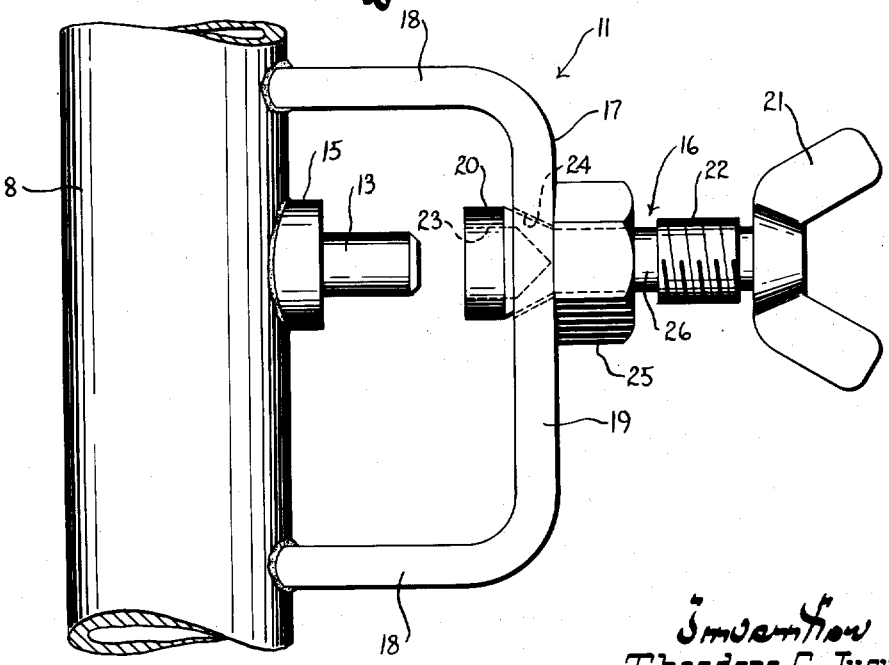
FIGURE 2 is a side elevational view of a portion of a metal scaffolding upright equipped with a connector of this invention shown in its unlocked or open position.
Figure 3:
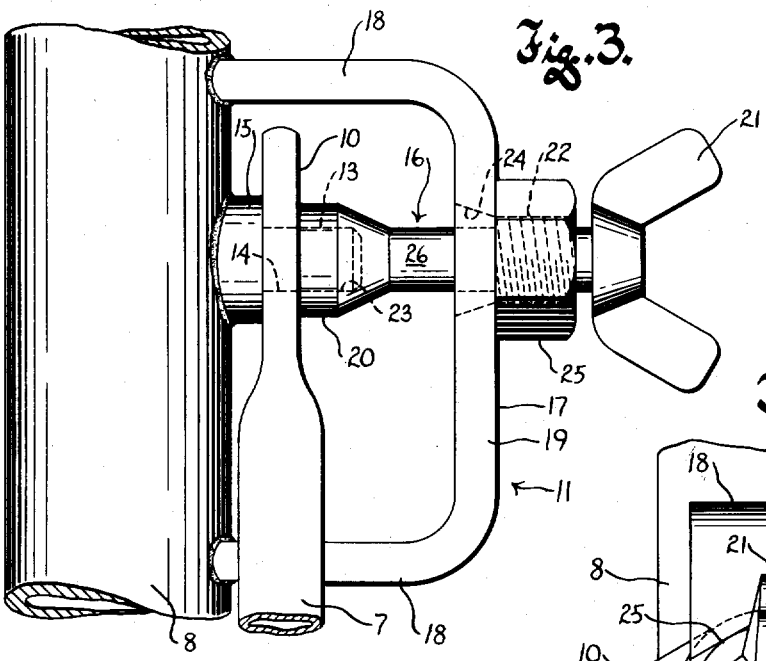
FIGURE 3 is a view similar to FIGURE 2 but showing the connector in its locked position with a diagonal brace anchored to the upright by the connector.

The connector, as best seen in FIGURES 2 and 3, comprises a stud 13 which may be secured to an upright 8 as by welding and which projects laterally outwardly from the upright, to extend through a substantially closely fitting aperture 14 in the flattened end portion of a diagonal brace 7 when the same is slipped axially onto the stud. Suitably a blank unthreaded bolt may be used for the stud, it being observed that the smooth shank of the stud facilitates installation of the diagonal brace onto it, while the head 15 of the blank bolt can be easily welded to the upright.

Cooperating with the stud to confine an apertured member such as a diagonal 7 against axially outward movement off of it is an enlongated locking member 16 mounted in a carrier or bracket 17 for endwise movement coaxially with the stud toward and from telescoping engagement with the stud. [The] *In the embodiment of the invention illustrated, the* carrier which supports the locking member is substantially U-shaped, having its legs 18 secured to the upright 8 above and below the stud and its bight portion 19 extending across the axis of the stud and spaced outwardly from the outer end thereof. [Thus] *With this construction* the stud is intermediate the legs of the carrier, spaced from both of them, and the stud and the legs of the carrier are disposed substantially in a common plane which preferably lies on the axis of the upright.

The *bight portion 19 of the carrier being spaced out from the post, may be considered an outboard support for the* shaft-like locking member 16 *which* extends transversely through the bight portion 19 [of the carrier] and has an enlarged socket portion 20 at its inner end, a winged head 21 at its outer end, and a medial threaded portion 22, all of which are coaxial with one another.

The socket portion 20 at the inner end of the locking member has a substantially larger outside diameter than the stud, and has a coaxial inwardly opening well 23 in which the stud is receivable, so that the socket-like inner end portion of the locking member can be telescoped over the outer end portion of the stud when the locking member is in its most inward position of axial movement. The transverse bore 24 in the bracket through which the locking member slidably extends has a smaller diameter than the socket portion of the locking member, so that the socket portion prevents the locking member from being axially withdrawn out of the bight of the bracket. Attention is directed to the fact that the inner end of the locking member is spaced a substantial distance from the outer end of the stud when the locking member is moved to its outermost or open position, at which its socket portion engages the bight of the bracket around the bore 24.

The threaded medial portion 22 of the locking member is adapted to cooperate with a mating internal thread on a fixed part on the bracket or carrier. In this instance the female thread is provided by a suitable nut 25 welded or otherwise permanently secured to the bight portion of the bracket at the outer face thereof, coaxially with the bore 24. The threaded medial portion 22 of the locking member has a slightly larger diameter than the unthreaded shank portion 26 which is inwardly adjacent thereto, so that the locking member is free to slide axially in the bore 24 between its open position and an intermediate position in which the socket portion 20 approaches telescoping engagement with the stud, at which point the medial threaded portion 22 of the locking member engages the mating internal thread provided by the nut 25, and further inward motion of the locking member to its fully locked position can be effected by screwing it into the nut.

The winged head 21 on the locking member may comprise a wing nut threaded onto its rear end portion and secured against rotation relative to the locking member shaft by staking or peening.

Figure 4:
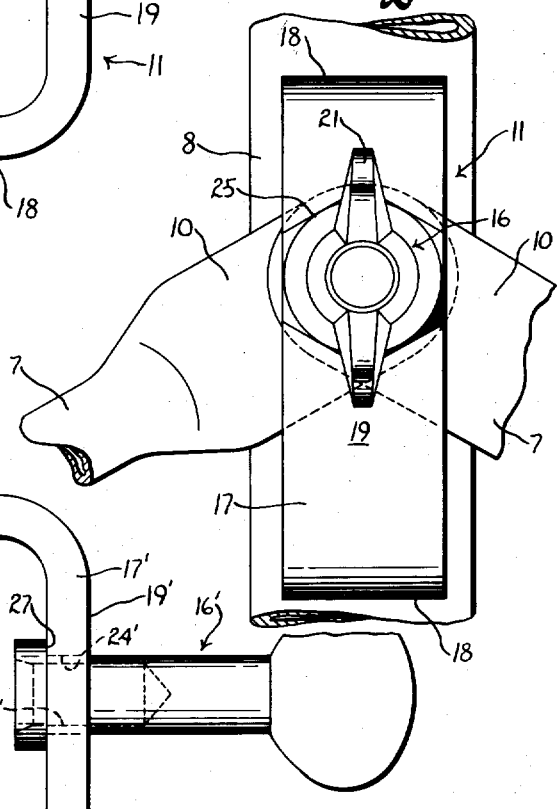
FIGURE 4 is a front elevational view of a modified embodiment of the connector of this invention, shown in its open position.

It will be evident that when the locking member is withdrawn axially to its fully open position the flattened and apertured end portion 10 of a diagonal brace can be moved laterally into the space between the stud and the inner end of the locking member and then slipped axially onto the stud. Thereafter the locking member is moved axially inwardly until its threaded medial portion 22 engages with the internal thread in the nut 25, whereupon the locking member is screwed inwardly to telescope its socket portion over the stud and clampingly confine the apertured end portion of the diagonal brace against the head of the stud. Obviously the diagonal brace can be quickly detached from the upright if the locking member is screwed outwardly and the brace withdrawn axially off of the study after the locking member is free of the nut. Obviously, too, more than one diagonal brace or other female member can be secured to the stud, as suggested by FIGURE 4 wherein two diagonal braces are anchored to an upright by the connector 11, with the flattened and apertured end portions 10 of the diagonal braces flatwise overlying one another.

Figure 5:
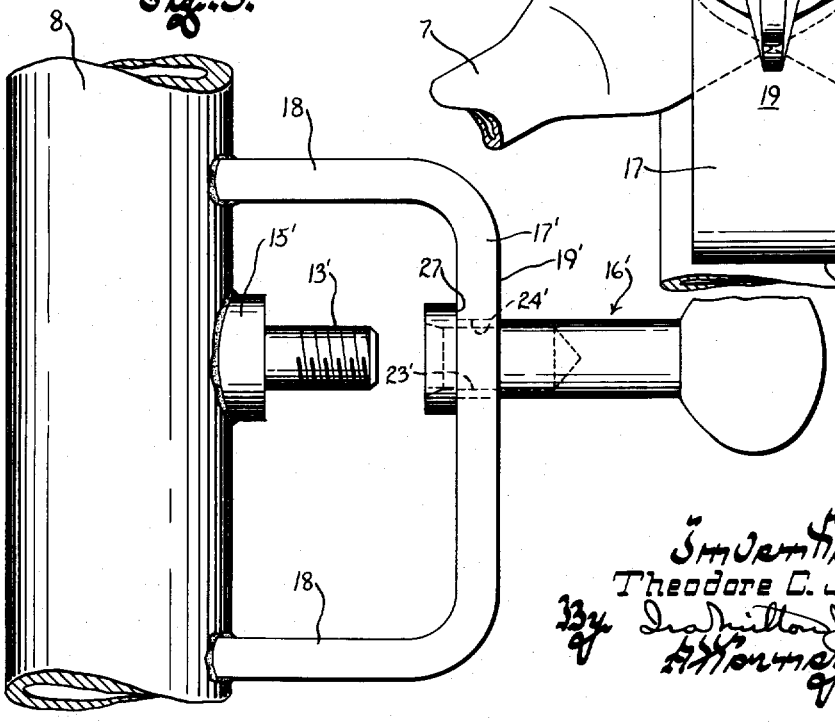
FIGURE 5 is a side elevational view of a modification in unlocked or open position of the connector shown in FIGURE 2.

The embodiment of the invention illustrated in FIGURE 5 has advantages in lower cost and greater simplicity than that described above, although it possesses the disadvantage of having a threaded stud 13′ upon which the female member is adapted to be recived, so that it is best suited for those installations where it will receive careful handling. The stud 13′ is an ordinary bolt having its head 15′ welded or otherwise fixed to an upright 8, while the locking member 16′ is cylindrical and has a diameter which may be uniform along its length but which is greater than that of the stud. The locking member 16′ is mounted in a smooth, substantially closely fitting transverse bore 24′ in the bight portion 19′ of the bracket 17′, for lengthwise in and out movement coaxially with the stud.

Opening to the inner end of the locking member 16′ is a coaxial threaded well 23′ by which the locking member may be telescopingly screwed onto the stud. Axial withdrawal of the locking member out of the bracket is prevented by an outwardly facing abutment 27 on the locking member, near its inner end, which in this case is shown as a circumferential shoulder that engages the inner face of the bight portion 19′ of the bracket to define the fully open position of the locking member.

From the foregoing description taken together with the accompanying drawings, it will be apparent that this invention provides a readily releasable connector for securing an apertured member, such as a diagonal brace for metal scaffolding, to a relatively fixed member, such as an upright of a metal scaffolding panel, which connector is simple, inexpensive and dependable and has no parts that can become disconnected from the relatively fixed member.

What is claimed as my invention is:

1. A connector for readily detachably securing a removable member having an aperture therethrough to a relatively fixed member, said connector comprising a [substantially U-shaped] bracket [having its legs] secured to said relatively fixed member and projecting outwardly from a surface thereon *with a part* [to hold the bight portions] of the bracket spaced from and substantially parallel to said surface; a stud fixed to said relatively fixed member *adjacent to* [intermediate the legs of] the bracket and projecting outwardly from said surface *toward and* partway to *said part* [the bight portion] of the bracket so that a removable member can be inserted between *said part* [the bight portion] of the bracket and the outer end of the stud and then moved axially inwardly relative to the stud to engage the latter in an aperture in the removable member; an elongated locking member having an inner end portion which is substantially larger in diameter than the outer end portion of the stud and having a coaxial well opening to its inner end in which the stud is axially receivable, said locking member being mounted in *said part* [the bight portion] of the bracket for endwise movement coaxially with respect to the stud between a locked position in which the inner end portion of the locking member is telescoped over the stud to confine a removable member engaged with the stud against outward movement axially off of the stud, and an unlocked position in which the inner end of the locking member is axially spaced from the outer end of the stud; and cooperating means on the locking member and on a fixed part of the connector for releasably securing the locking member in its locked position.

2. The connector of claim 1 wherein said last named means comprises a thread on the outer end portion of the stud and a mating internal thread in the well in the locking member.

3. The connector of claim 1 wherein said last named means comprises an external thread on the medial portion of the locking member and a cooperating internal thread in *said part* [the bight portion] of the bracket..

4. The connector of claim 1 further characterized by the fact that *the bracket is U-shaped and has its legs secured to the relatively fixed part at opposite sides of the*

*stud, and wherein said part of the bracket constitutes the bight portion of the* U, *and further characterized by the fact that* a portion of the locking member which is axially outward of said inner end portion thereof is smaller in diameter than said inner end portion of the locking member and is endwise slidable in a substantially closely fitting bore in the bight portion of the bracket so that the larger diameter inner end portion of the locking member precludes axial withdrawal of the locking member all the way out of the bracket.

5. On a relatively fixed member, a connector for readily releasably anchoring to the relatively fixed member a removable member which has an aperture therethrough, said connector comprising: a stud secured on the relatively fixed member and projecting outwardly from a surface thereof, substantially normal to said surface, for engagement in an aperture in a removable member to confine the latter against movement laterally relative to the stud; means providing a carrier secured on the relatively fixed member and extending across the axis of the stud; spaced outwardly from the outer end thereof; an elongated locking member having an inner end portion which is substantially larger in diameter than the outer end portion of the stud and having a coaxial well opening to its inner end in which the stud is axially receivable, said locking member being mounted in said carrier for endwise motion coaxially with respect to the stud between a locked position in which the inner end portion of the locking member is telescoped over the stud to confine a removable member engaged with the stud against outward movement axially off of the same, and an unlocked position in which the inner end of the locking member is axially spaced from the outer end of the stud; and cooperating means on the locking member and on a fixed part of the connector for releasably holding the locking member in its locked position.

*6. On a post, a connector for readily detachably anchoring an apertured end portion of a brace to the post, the connector comprising : an outboard support fixed to the post and overlying the post at one side thereof in spaced relation thereto, said support having an internally threaded hole therein the axis of which is perpendicular to the adjacent side of the post; a clamping screw threaded in said internally threaded hole; an abutment on the clamping screw facing the adjacent side of the post to clamp the apertured end portion of the brace against the side of the post as the clamping screw is tightened; and inter-engageable male and female parts one of which is on the post and the other on the clamping screw, the male part being engageable in the aperture in the brace when the screw is in a position in which its abutment is spaced from the post, entry of the male part into the aperture in the brace holding the apertured end portion of the brace in position to be clamped between the abutment on the screw and the side of the post, and said male and female parts being engaged when the screw is tightened to clamp the apertured end portion of the brace against the adjacent side of the post.*

References Cited in the file of this patent or the original patent

UNITED STATES PATENTS

| | | |
|---|---|---|
| 2,726,902 | Borgman et al. | Dec. 13, 1955 |
| 2,830,855 | Hyre | Apr. 15, 1958 |
| 2,831,734 | Rapoport et al. | Apr. 22, 1958 |